US006978966B2

(12) United States Patent
Wang et al.

(10) Patent No.: US 6,978,966 B2

(45) Date of Patent: Dec. 27, 2005

(54) REFLECTOR DEPLOYMENT ERROR ESTIMATION

(75) Inventors: Hanching Grant Wang, Hacienda Heights, CA (US); Richard A. Fowell, Rolling Hills Estates, CA (US); Arunkumar P. Nayak, Van Nuys, CA (US)

(73) Assignee: The Boeing Company, Chicago, IL (US)

(*) Notice: Subject to any disclaimer, the term of this patent is extended or adjusted under 35 U.S.C. 154(b) by 94 days.

(21) Appl. No.: 10/770,903

(22) Filed: Feb. 2, 2004

(65) Prior Publication Data

US 2005/0178874 A1 Aug. 18, 2005

(51) Int. Cl.[7] .............................. B64G 1/36; B64G 1/24

(52) U.S. Cl. ..................... 244/3.21; 244/3.1; 244/3.15; 244/3.16; 244/158 R; 244/164; 342/165; 342/173; 342/174; 342/175; 342/195

(58) Field of Search ...................... 244/3.1–3.3, 158 R, 244/158 A, 159–173; 342/25 R–26 D, 165–175, 342/195, 352–358, 368–384; 701/207, 222, 701/223, 226

(56) References Cited

U.S. PATENT DOCUMENTS

| | | | | |
|---|---|---|---|---|
| 4,864,315 A * | 9/1989 | Mohuchy | .................... | 342/173 |
| 5,929,809 A * | 7/1999 | Erlick et al. | ................ | 342/372 |
| 6,556,166 B1 * | 4/2003 | Searcy et al. | ............... | 342/165 |
| 6,717,546 B2 * | 4/2004 | Winter et al. | ............... | 342/165 |
| 6,771,210 B2 * | 8/2004 | Zoratti et al. | ............... | 342/165 |

OTHER PUBLICATIONS

"In-Space Pattern Measurement Techniques For Large Aperture Antennas", by C. Hatchett et al., Supplement to IEEE Transactions on Aerospace and Electronic Systems, vol. AES-3, No. 6, Nov. 1967.

"Antenna Boresight Parameter Estimation", by Richard M. Terasaki, J. Spacecraft, vol. 8, No. 10; Oct. 1971.

* cited by examiner

*Primary Examiner*—Bernarr E. Gregory

(74) *Attorney, Agent, or Firm*—Jonathan W. Hallman; MacPherson Kwok Chen & Heid LLP

(57) ABSTRACT

A system and method for performing in-orbit alignment calibration using on-board attitude sensors to improve reflector alignment after deployment to improve spacecraft pointing.

39 Claims, 5 Drawing Sheets

REFLECTOR DEPLOYMENT ERROR ESTIMATION

TECHNICAL FIELD

The present invention relates generally to an in-orbit reflector alignment calibration system and method for better spacecraft pointing.

BACKGROUND

The alignment calibration of deployable components on a spacecraft, such as reflectors, antennas and other payloads, is generally carried out during an in-orbit test (IOT) in order to meet on-station precision pointing requirements. Deployable reflectors, such as shown in FIG. 1, can have large in-orbit alignment errors due to the lack of deployment repeatability. A typical deployment error, for example, can be up to an unacceptable 0.4°.

Currently, many spacecraft operate with a beacon sensor (or earth sensor), a sun sensor (SSA), and gyros for on-station attitude determination. The beacon sensor provides roll and pitch attitude measurements continuously. The SSA sensor provides yaw (and pitch) attitude measurements when the sun is in the sun sensor field-of-view (FOV). The gyros provide accumulative roll, pitch, and yaw attitude measurements continuously. Typically, beacon sensors consist of a reflector and feed arrays for receiving radio frequency (RF) signals from a beacon ground station on the earth surface, and a beacon sensor processing unit.

Each spacecraft orbit duration is operationally divided into two periods, a “gyro calibration” period and a “gyro compassing” period. Gyro calibration occurs during approximately 4 hours of each orbit, when the sun is in the FOV of the SSA with a favorable geometric dilution factor relative to the beacon sensor. During the gyro calibration period, 3-axis attitude measurements are available, such as the roll and pitch attitude from the beacon and yaw from the SSA. The measured 3-axis attitude is used to update the spacecraft attitude estimate and calibrate the gyro bias and other gyro parameters.

During gyro compassing, which occurs for approximately the remaining 20 hours of each orbit, roll and pitch attitude measurements from the beacon sensor are used to update the spacecraft roll and pitch attitude, however, the yaw attitude is not available. The roll gyro sensor is used to estimate the yaw attitude and maintain yaw pointing by the gyro compassing method. Yaw attitude estimation accuracy by gyro compassing directly depends on the roll gyro bias calibration accuracy in the gyro calibration period and subsequent drift during the gyro compassing period.

Roll gyro bias drift is affected by multiple factors, such as the reflector and sensor thermal distortion, reflector deployment alignment knowledge error (reflector is mechanically co-aligned with the beacon sensor), and time-varying spacecraft steering rate. For a mobile communication satellite with orbital inclination and flying target-normal steering, the steering rate has sinusoidal components in all three axes, which is especially pronounced in the roll and yaw axes. Specifically, the alignment knowledge error of the deployed reflector together with the time-varying body steering rate produces an apparent sinusoidal gyro bias error. This, in turn, causes a corresponding yaw pointing error during the gyro compassing period.

In order to reduce the yaw pointing error, the roll gyro bias error needs to be reduced in the gyro compassing period. One effective way to reduce the roll gyro bias error is to reduce the component of the error caused by the reflector (or beacon) alignment knowledge error. To meet the spacecraft requirements for precision pointing, it has been found that the knowledge error of the reflector alignment should be less than about 0.05° versus the deployment repeatability of 0.4°.

As a result, there is a need for a system and method for reflector deployment error estimation.

SUMMARY

Systems and methods are disclosed herein to provide reflector deployment error estimation.

In accordance with an aspect of the present invention, a method is provided for performing in-orbit alignment calibration. The method includes providing a spacecraft, which includes a first sensor, a second sensor and a deployable component. The method also includes deploying the deployable component having the second sensor coupled thereto. The second sensor is pointed at a first known object to position the spacecraft relative to the first known object. The method includes performing a maneuver to cause the spacecraft to rotate in a reference direction to generate a trajectory of a second known object in a field-of-view (FOV) of the first sensor. Data is generated from the trajectory of the second known object in the FOV of the first sensor and from the second sensor representing a measured separation angle between the second known object and the first known object. An alignment error is calculated for the second sensor using the difference between the measured separation angle and a predicted separation angle.

In another aspect of the present invention, a system is provided for performing in-orbit alignment calibration. The system includes a spacecraft including a first sensor, a second sensor, a deployable component and a processor adapted to execute instructions including: deploying the deployable component having the second sensor coupled thereto; pointing the second sensor at a first known object to position the spacecraft relative to the first known object; performing a maneuver to cause the spacecraft to rotate about a reference direction to generate a trajectory of a second known object in a field-of-view (FOV) of the first sensor; generating data from the trajectory of the second known object in the FOV of the first sensor and from the second sensor representing a measured separation angle between the second known object and the first known object; and calculating an alignment error for the second sensor using the difference between the measured separation angle and a predicted separation angle.

In yet another aspect of the present invention, a method is provided for performing in-orbit alignment calibration. The method includes providing a spacecraft including at least a first star tracker, a second star tracker and a deployable reflector; deploying the deployable reflector having the second star tracker coupled thereto; pointing the second star tracker at a first celestial star to position the spacecraft relative to the first celestial star; performing a maneuver of the spacecraft to cause the spacecraft to rotate in a reference direction to generate a trajectory of stars in a field-of-view (FOV) of the first star tracker; generating data from the trajectory of stars in the FOV of the first star tracker and from the first celestial star in the second star tracker FOV which represents a measured separation angle between the celestial star and stars; calculating the difference between the measured separation angle and a predicted separation angle to provide a second star tracker alignment error; providing a deviation factor based on the coupling between the second star tracker and the deployable reflector; and calculating a mechanical deployment error of the deployable reflector by applying the deviation factor to the second star tracker alignment error.

In yet another aspect of the present invention, a method is provided for performing in-orbit alignment calibration, which includes providing a spacecraft including at least one star tracker, a beacon sensor and a deployable reflector; deploying the deployable reflector having the beacon sensor coupled thereto; pointing the beacon sensor at a beacon ground station to position the spacecraft relative to the beacon ground station; performing a maneuver of the spacecraft to cause the spacecraft to rotate in a reference direction to generate a star trajectory in a field-of-view (FOV) of the star tracker; generating data from the trajectory of the stars in the FOV of the star tracker and from the beacon sensor which represents a measured separation angle between the ground station and the stars; calculating the difference between the measured separation angle and a predicted separation angle to provide a beacon alignment error; providing a beam deviation factor based on the coupling between the beacon sensor and the deployable reflector; and calculating a mechanical deployment error of the deployable reflector by applying the beam deviation factor to the beacon alignment error.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 2:
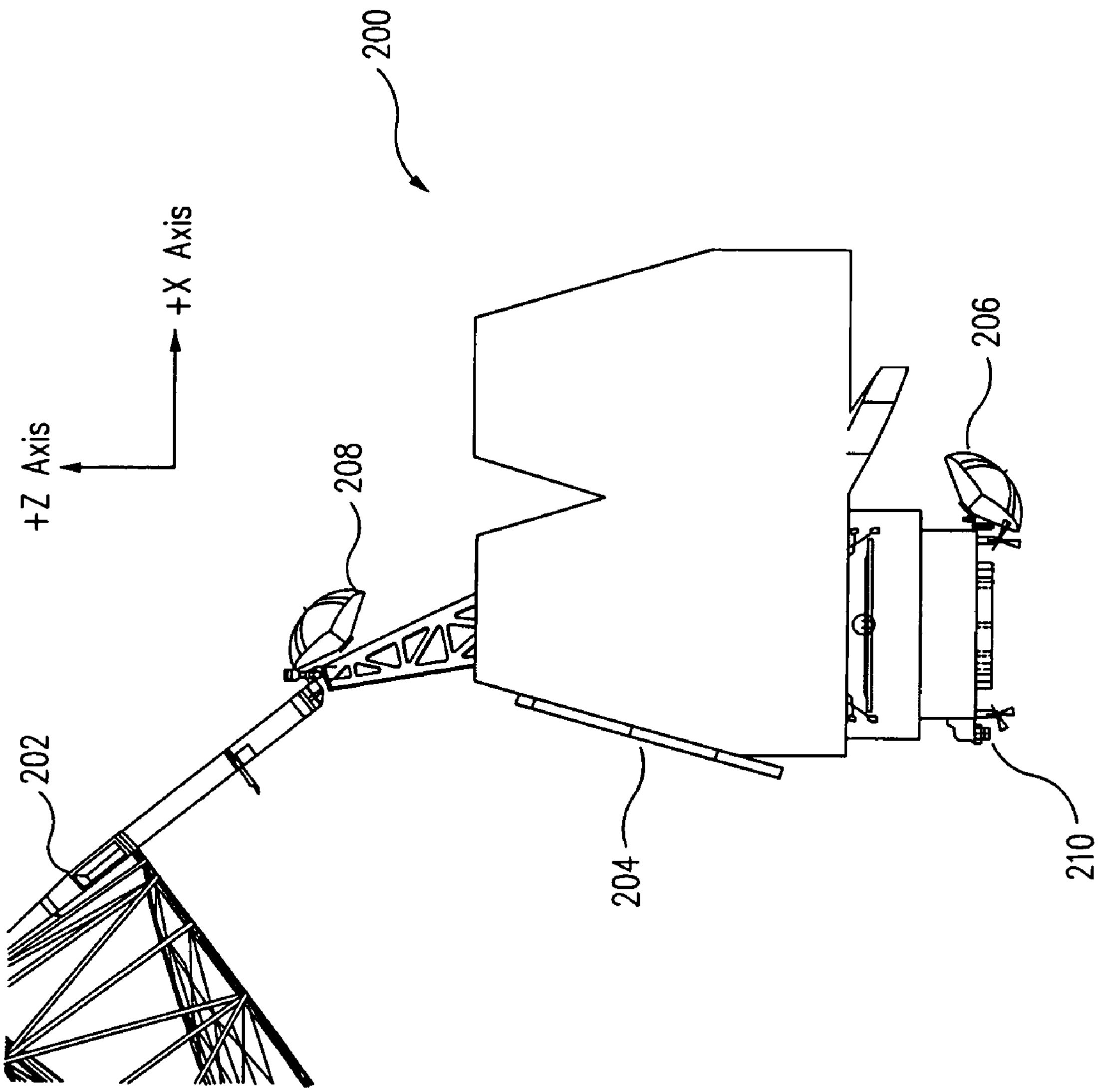
FIG. 2 is a simplified illustration of a spacecraft including a suite of attitude sensors in accordance with an embodiment of the present invention.

FIG. 2 is a simplified illustration of spacecraft 200 in accordance with an embodiment of the present invention. Spacecraft 200 can be any type of spacecraft that may deploy peripheral components. In one embodiment, spacecraft 200 is a geo-stationary mobile communications satellite (GEM) system including, for example, at least one digital signal processor (DSP), at least one spacecraft control processor (SCP) and associated memory capable of transmitting and receiving signals and for executing commands necessary to control the attitude of the spacecraft, the deployment of peripheral components, and the functioning of various actuators and sensors.

Figure 1:
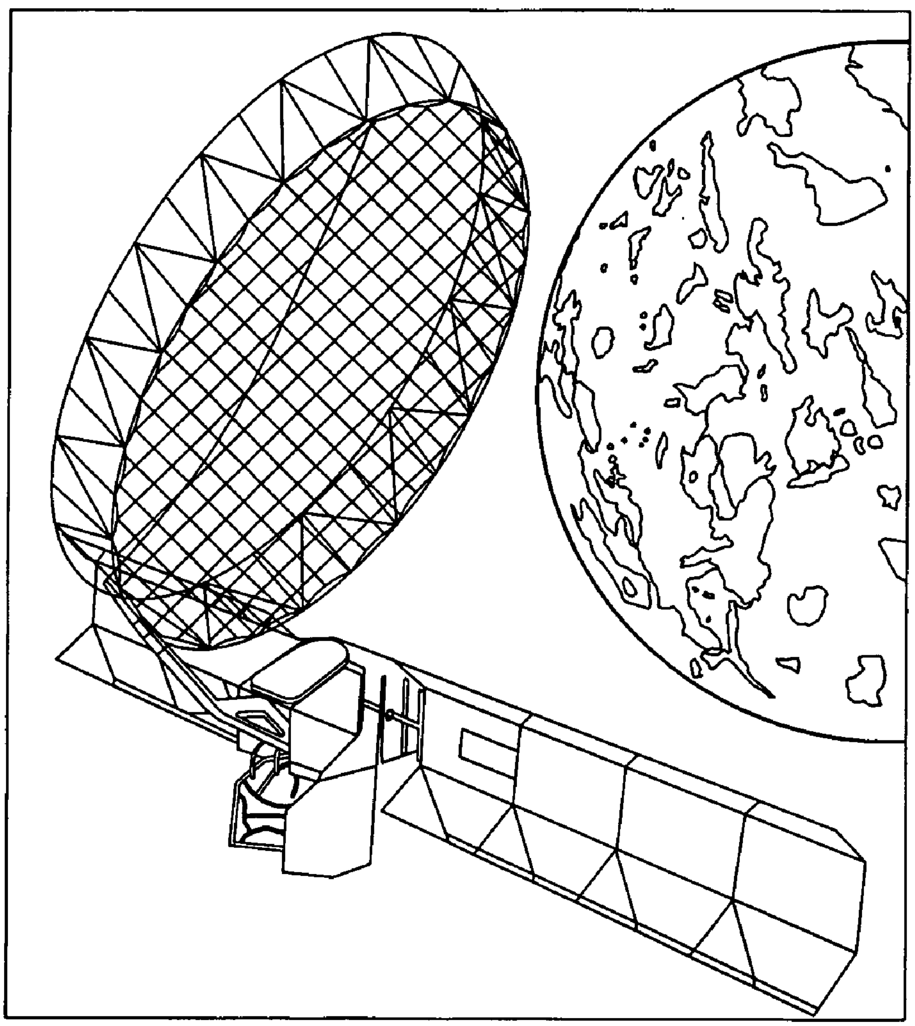
FIG. 1 is an illustration of a spacecraft having a deployed reflector in accordance with the present invention.

The peripheral components associated with spacecraft 200 may include sensors, reflectors, antennas, cameras and the like. The peripheral components may be stationary (i.e. pre-positioned) or deployable. For example, spacecraft 200 can include a deployable reflector 202 (see also FIG. 1), which is deployed into position at some time after launching of spacecraft 200. In one embodiment, deployable reflector 202 is an L-band reflector for an L-band mobile communications system.

Stationary peripheral components on spacecraft 200 can include, for example, a suite of attitude determination sensors (ADS). The suite of attitude determination sensors can include for example, a beacon sensor, a star tracker, a sun sensor, an earth sensor and the like. In one exemplary embodiment, spacecraft 200 includes a sensor suite including sensors disposed on various and predetermined locations on the spacecraft. In this exemplary embodiment, the sensors may include for example, a beacon sensor 204, Sun Sensor Assembly (SSA) sensors 206 and 208, and a Static Thermopile Earth Sensor Assembly (STESA) sensor 210. As indicated in FIG. 2, each sensor 204, 206, 208 and 210 has an orientation, and a specific sensor FOV.

In one embodiment, beacon sensor 204 is coupled to reflector 202, such that when reflector 202 distorts, beacon sensor 204 distorts a corresponding amount. The relationship between the two distortions is a designed beam deviation factor (BDF) which can be calculated with substantial precision. In one embodiment, for every 0.1° of movement of deployable reflector 202, the beam from beacon sensor 204 moves 0.2°. Accordingly, reflector alignment can be computed from the alignment of beacon sensor 204.

Alternatively, a star tracker can be attached to deployable reflector 202 to be displaced along with the reflector. In this alternative embodiment, the alignment of deployable reflector 202 can be calibrated as described below using a deviation factor of one.

Beacon sensor 204 receives radio frequency (RF) signals from a ground beacon station positioned on the earth's surface. In this way, beacon sensor 204 can be a full-time sensor, which has the ground beacon station in its FOV at all times. Measurement accuracy of beacon sensor 204, excluding thermal deformation, can be expected to be better than 0.02°.

In one embodiment, the SSA sensors 206 and 208 include six segmented solar cells with precision reticles used to measure spacecraft attitude relative to the sun about two orthogonal axes. In this embodiment, SSA sensor 206 is mounted in the +x, −z direction of spacecraft 200. The SSA sensor 208 is mounted in the +x, +z direction of spacecraft 200. Both sensors 206 and 208 are operatively coupled to an appropriately dedicated SCP and other associated electronics.

The SSA sensor is generally a wide FOV sensor. In one embodiment, with no intent to limit the invention, the SSA sensors 206 and 208 can have a 100° by 100° FOV. SSA sensors 206 and 208 may also have a 120°×120° straylight stayout zone.

Generally, it is expected that the measurement accuracy for SSA sensor 206 and SSA sensor 208, excluding thermal deformation, can be better than 0.03°. The SSA sensor alignment matrices can be precisely surveyed before launch and remain accurate during a mission since SSA sensors 206 and 208 are not further deployed during the mission.

In accordance with the present invention, the purpose of antenna mapping is to calibrate the misalignment between payloads and attitude sensors, and between payloads themselves. Since the aggregate error between, for example, deployable reflector 202 and beacon sensor 204 is negligible, the reflector alignment can be computed from beacon alignment using the designed BDF. Although the intent is for reflector deployment error calibration, it is sufficient to calibrate beacon alignment, or the alignment of any sensors attached to the reflector.

In an exemplary embodiment of the present invention, the attitude sensors are aligned with one another, so that all attitude sensors are aligned with the payload after antenna mapping. Inter-sensor alignment is done relatively between the entire sensor suite. The SSA sensors 206 and 208 are surveyed pre-launch. Beacon sensor 204 is deployed after launch. Accordingly, in accordance with the present invention, SSA sensors 206 and 208 are used to calibrate the alignment of beacon sensor 204. The inter-sensor misalignment between SSA sensor 206 and SSA sensor 208, if within reasonable bounds, is mainly used for a diagnostic check.

The misalignment between SSA sensor 206 and SSA sensor 208 can be calculated when the sun appears in the FOV of both SSA sensors 206 and 208 as described in detail below. The calculation is best made on certain days of the equinox season when spacecraft 200 can be placed in nominal on-station operation. Otherwise, the calculation can be done at sun pointing mode by holding the sun in the overlap region of both SSA sensors 206 and 208. Other more elaborate calibration methods can be used, for example, using the gyro data to bridge a trajectory between non-overlapping regions of the two SSA sensors.

In the present invention, spacecraft 200 includes SSA sensor 206 and SSA sensor 208 placed at two different orientations. The SSA sensors at two different orientations may cause the sensors 206 and 208 to experience different thermal distortion in orbit. The SSA sensor 206 and SSA sensor 208 are surveyed independently. During IOT, the relative misalignment between SSA sensor 206 and SSA sensor 208 can be calibrated to reduce the switching transient and to improve the service pointing.

Figure 3:
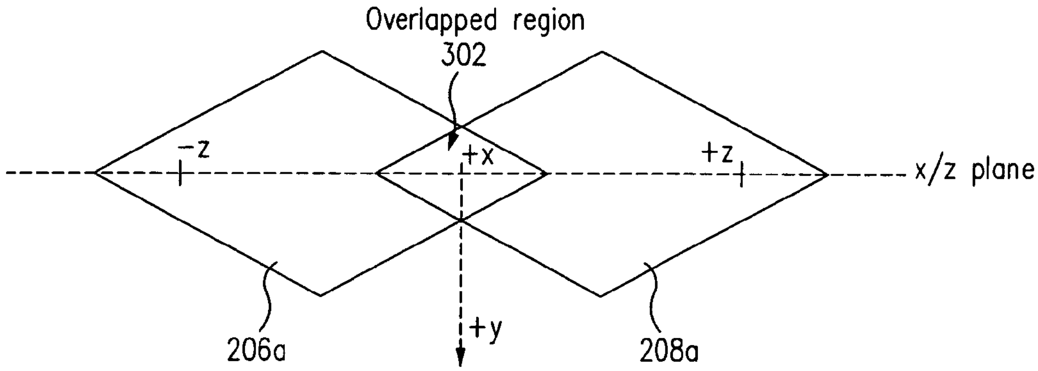
FIG. 3 illustrates the overlapped region of the FOV for two SSA sensors positioned as depicted in FIG. 2 in accordance with an embodiment of the present invention.

The FOV for each SSA sensor 206 and 208 can be represented by a diamond shaped region (hereinafter the FOV regions designated 206*a* and 208*a*, respectively, as in FIG. 3). FIG. 3 illustrates the overlapped FOV region 302 for SSA sensor FOV 206*a* and SSA sensor FOV 208*a*. If both SSA sensors 206 and 208 are substantially co-aligned, when the sun appears in the FOV region 302, both SSA sensors 206 and 208 should provide substantially identical measured sun unit vectors in body frame coordinates. Therefore, any deviation of the measurements received from both SSA sensors can be used to calculate the misalignment between SSA sensors. The relative misalignment between SSA sensor 206 and SSA sensor 208 can be calibrated. The in-plane component (pitch) is more observable than the out-of-plane components. The elevation (yaw) out-of-plane component, in turn, is more observable than the roll out-of-plane component. The misalignment can be distributed between the two SSA sensors based on a-priori knowledge of SSA sensor alignment accuracy.

In one embodiment, measured sun unit vectors from the SCP designated for each sensor are sampled at the same time. It has been determined that due to the asynchronous nature of the SCP computer software unit (CSU) dispatch, the time difference can be as high as 0.5 second if both SCP are sampled at the same frequency. In this embodiment, the maximum time mismatch between the two strings of data is less than 1 second. The motion of spacecraft 200 relative to the sun is 15 dg/hr. Thus, the error due to the 1 second time mismatch is about 0.004°. Because the error is small it can typically be neglected during calibration, which means the data from normal telemetry is sufficient for the accuracy sought in the present invention.

Under the ideal condition that SSA sensor 206 and SSA sensor 208 are perfectly co-aligned and provide perfect measurements, the following equation is true:

$$\hat{s}_{2,B}=C_{S2}{}^{B}\hat{s}_{S2}=C_{S1}{}^{B}\hat{s}_{S1}\hat{s}_{S1}=\hat{s}_{1,B}$$

where $\hat{s}_{1,B}$ and ŝ2,B represent the sun positions (resolved in the body frame) measured by SSA sensors 206 and 208, respectively, $\hat{s}_{S1}$ and $\hat{s}_{S2}$ represent the sun positions (resolved in the sun sensor frame) measured by SSA sensors 206 and 208, respectively, and $C_{S1}{}^{B}$ and $C_{S2}{}^{B}$ represent direction cosine matrices of the body frame with respect to the sensor frame of SSA sensors 206 and 208, respectively.

When there is a small misalignment between SSA sensor 206 and SSA sensor 208, the following small angle approximation applies:

$$C_{Bn}{}^{B}=(I-\theta)$$

$$\hat{s}_{2,B}=C_{Bn}{}^{B}\hat{s}_{1,Bn}=(I-\theta)\hat{s}_{1,Bn} \text{ or}$$

$$\hat{s}_{2,B}-\hat{s}_{1,Bn}=[\hat{s}_{1,Bn}]\theta$$

where script "B" denotes the perceived body frame as inferred by the sensor frame of sun sensor 208, script "Bn" denotes the perceived body frame as inferred by the sensor frame of sun sensor 206, $C_{Bn}{}^{B}$ represents the misalignment direction cosine matrix between the aforementioned two body frames, θ is the equivalent misalignment Euler angle between the aforementioned two body frames, and is a conventional vector cross-product operator.

For n measured data points, the general representation of least-square solution of misalignment angle θ is:

$$y_i=A_i\theta i=1{:}n$$

$$\theta=\left(\prod_{1}^{n}A_i^{*}A_i\right)^{-1}\prod_{1}^{n}A_i^{*}y_i$$

where $y_i$ represents $\hat{s}_{2,B}-\hat{s}_{1,Bn}$ in the previous equation, and likewise $A_i$ represents $[\hat{s}_{1,Bn}]$ in the previous equation.

Once the misalignment matrix $C_{Bn}{}^{B}$ is found per the equation above, SSA sensor 206 alignment matrix can be recalculated as:

$$\hat{C}_{S1}{}^{B}=C_{Bn}{}^{B}C_{S1}{}^{Bn}$$

The new alignment matrix of SSA sensor 206 can be uploaded to its corresponding SCP CSU to improve the alignment accuracy.

It has been found that in one operational embodiment, the estimated inter-sensor alignment error between SSA sensor 206 and SSA sensor 208 is about 0.04°.

Figure 4:
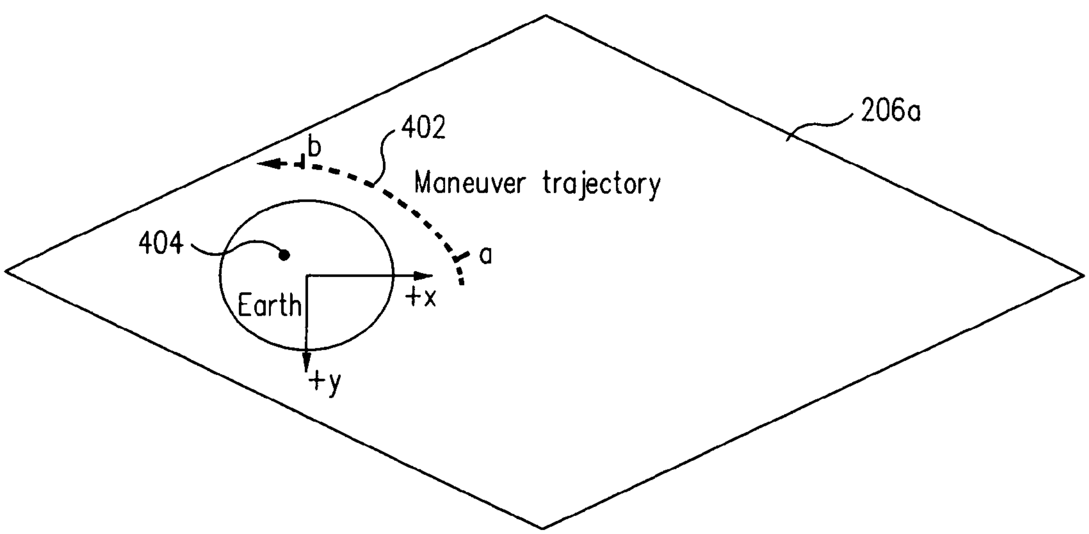
FIG. 4 illustrates a maneuver performed using beacon boresight rotation such that a known object trespasses a desired trajectory in the SSA FOV in accordance with an embodiment of the present invention.

In accordance with the present invention, FIG. 4 illustrates the following spacecraft maneuver performed using beacon boresight rotation such that the sun traverses a desired trajectory in the FOV of at least one SSA sensor.

The maneuver makes it beneficial to compare beacon measurements with SSA sensor measurements to infer reflector deployment error with a favorable geometric dilution factor. The maneuver can be performed at different times of the day with either or both SSA sensors 206 and 208. The maneuver can be performed by using a trajectory following steering law (commanding a trajectory of a desired attitude), by commanding multiple desired attitudes, by commanding multiple desired attitude offsets, by commanding desired attitude rate offsets, or by using time-sequence control.

FIG. 4 depicts an SSA FOV cut that can be used for reflector alignment calibration. In one embodiment, the maneuver of spacecraft 200 creates a corresponding sun trajectory 402 that appears in SSA sensor FOV 206*a*. The corresponding sun trajectory 402 through the FOV can be a 360° circular rotation, or a segment of it, along the beacon boresight. For a segment trajectory, depending on the season of the year and the SSA mounting orientation, either a clockwise or a counter-clockwise rotation may be used.

In one embodiment, as shown in FIG. 4, sun trajectory 402 can be created using a 2-point hold maneuver from point ‘a’ to ‘b’. At point ‘a’ the sun is held in the x/z plane of beacon sensor frame for direct azimuth (az) error calibration, and at point ‘b’ the sun is held in the y/z plane of beacon sensor frame for direct elevation (el) error calibration.

In an alternative embodiment, a star tracker can be used in lieu of the SSA sensors. In this alternative embodiment, the rotation maneuver is not needed for calibrating the beacon alignment error, since the star tracker is capable of tracking multiple separated stars in the FOV to calibrate both azimuth and elevation errors. If a rotation maneuver is used, the reference direction of the rotation can be a celestial star in the FOV of a second star tracker that can be attached to the reflector.

Under the ideal condition that there is no reflector deployment error and that the beacon sensor and SSA sensor measurements are perfect, it is expected that the predicted sensor separation angle from ephemeris is equal to the measured sensor separation angle as follows:

$$\langle \hat{s}_{ECI}, \hat{b}_{ECI} \rangle = \langle C_S^{Bn} \hat{s}_S, C_{BCN}^{Bn} \hat{b}_{BCN} \rangle$$

where the subscript “s” can be “s1” if sun senor 206 is used for measurements or “s2” if sun senor 208 is used for measurements, $\hat{s}_{ECI}$ is the sun position in the ECI (Earth-Centered Inertial) frame computed by the ephemeris, $\hat{b}_{ECI}$ is the beacon station position in the ECI frame computed by the ephemeris, $\hat{b}_{BCN}$ is the measured beacon station position in the beacon sensor frame, and ${C_{BCN}}^{Bn}$ is the direction cosine matrix from the beacon sensor frame to the nominal body frame, and $$\langle , \rangle$$

is the conventional vector inner-product operator.

When the reflector deployment error is a small angle affecting the beacon sensor alignment matrix (and the sun sensor alignment matrix is relatively accurate), then the following approximation holds:

$$\begin{aligned} \langle \hat{s}_{ECI}, \hat{b}_{ECI} \rangle &= \langle C_S^B \hat{s}_S, C_{Bn}^B C_{BCN}^{Bn} \hat{b}_{BCN} \rangle \\ &= \langle \hat{s}_B, [I - \theta_B \otimes] \hat{b}_{Bn} \rangle \end{aligned}$$

$$\begin{aligned} \langle \hat{s}_{ECI}, \hat{b}_{ECI} \rangle - \langle \hat{s}_B, \hat{b}_{Bn} \rangle &= \langle \hat{s}_B, [\hat{b}_{Bn} \otimes] \theta_B \rangle \\ &= \langle [\hat{b}_{Bn} \otimes]^T \hat{s}_B, \theta_B \rangle \\ &= (\hat{s}_B)^T [\hat{b}_{Bn} \otimes] \theta_B \end{aligned}$$

where script “B” denotes the true body frame, script “Bn” denotes the perceived body frame as inferred by the nominal beacon sensor frame, ${C_{Bn}}^B$ represents the misalignment direction cosine matrix between the aforementioned two body frames, $\theta_B$ is the equivalent misalignment Euler angle between the aforementioned two body frames, ${C_{BCN}}^{Bn}$ represents the direction cosine matrix from the beacon sensor frame to the nominal body frames, and $\hat{b}_{Bn}$ is the measured beacon station position in the nominal body frame.

For n measured data points, the general representation of least-square solution in batch processing is:

$$y_i = A_i \theta_B \quad i = 1{:}n$$

$$\theta_B = \left( \prod_1^n A_i^* A_i \right)^{-1} \prod_1^n A_i^* y_i$$

where $y_i$ represents $$\langle \hat{s}_{ECI}, \hat{b}_{ECI} \rangle - \langle \hat{s}_B, \hat{b}_{Bn} \rangle$$

in the previous equation, and likewise $A_i$ represents $(\hat{s}_B)^T[\hat{b}_{Bn}]$ in the previous equation.

The standard Kalman filter techniques can also be employed to estimate the alignment error.

In one exemplary operational embodiment, the estimated deployment error is found to be less than 0.05°. Averaging of multiple trajectory points is inherent in the least-square solution above. Table 1 summarizes the reflector deployment estimation error with a 4-point statistical averaging in accordance with an exemplary embodiment of the present invention.

TABLE 1

| Deployment Error Bounding Budget - SUN in FOV | | |
|---|---|---|
| Maximum yaw slew angle | 100 | deg |
| Yaw slew rate | 0.1 | Deg/sec |
| Maximum duration of slew | 1000 | sec |
| Error Sources | Roll, deg | pitch, deg |
| SSA Measurement Error | 0.050 | 0.050 |
| Beacon Measurement Error | 0.030 | 0.025 |
| L-band deployment Error, single point | 0.058 | 0.056 |
| 4 points averaging | 0.029 | 0.028 |
| Current Deployment Error Allocation | 0.050 | 0.050 |

If the simplified maneuver from point ‘a’ to ‘b’ is used, by holding at each point, for example, for 5 minutes for noise filtering and averaging, the equation is simplified to be:

$$az = \langle \hat{s}_{ECI}, \hat{b}_{ECI} \rangle_a - \langle \hat{s}_{BCN}, \hat{b}_{BCN} \rangle_a$$

$$el = \langle \hat{s}_{ECI}, \hat{b}_{ECI} \rangle_b - \langle \hat{s}_{BCN}, \hat{b}_{BCN} \rangle_b$$

$$\theta_{BCN} = \begin{bmatrix} el \\ az \\ 0 \end{bmatrix}_{BCN}$$

$$\theta_B = C_{BCN}{}^B \theta_{BCN}$$

$$C_{Bn}{}^B = [I - \theta_B]$$

$$(BDF)\ \theta_{ANT} = \theta_{BCN}$$

where subscript "a" denotes the trajectory point a, subscript "b" denotes the trajectory point b, subscript "BCN" denotes the beacon sensor frame, az is the computed azimuth misalignment in the beacon sensor frame, el is the computed elevation misalignment in the beacon sensor frame, $\theta_{ANT}$ is the reflector mechanical deployment error, $\theta_{BCN}$ is the deployment error as measured by the beacon sensor, and BDF (Beam Deviation Factor) is the conversion factor from $\theta_{ANT}$ to $\theta_{BCN}$ The reflector mechanical deployment error can be used for assessment of beam distortion. The antenna frame in SCP is the alignment of the reflector electrical boresight that is identical to the beacon boresight. The beacon sensor frame and the antenna frame can be adjusted using the following transformation matrix to better the yaw estimation:

$$\hat{C}_{BCN}{}^B = C_{Bn}{}^B C_{BCN}{}^{Bn}$$

$$\hat{C}_B{}^{ANT} = C_{Bn}{}^{ANT} (C_{Bn}{}^B)^T$$

where $\hat{C}_{BCN}{}^B$ represents the direction cosine matrix from the beacon sensor frame to the true body frame, $\hat{C}_{Bn}{}^{ANT}$ represents the direction cosine matrix from the nominal body frame to the antenna (or reflector) frame, and $\hat{C}_B{}^{ANT}$ represents the direction cosine matrix from the true body frame to the antenna (or reflector) frame. The equations above are obtained using the chain rule for sequential transformations (or rotations).

For example, with no intent to limit the invention, Table 2 provides the data typically needed throughout a 360° slew for the sun in FOV maneuver in accordance with one embodiment of the present invention.

Figure 5:
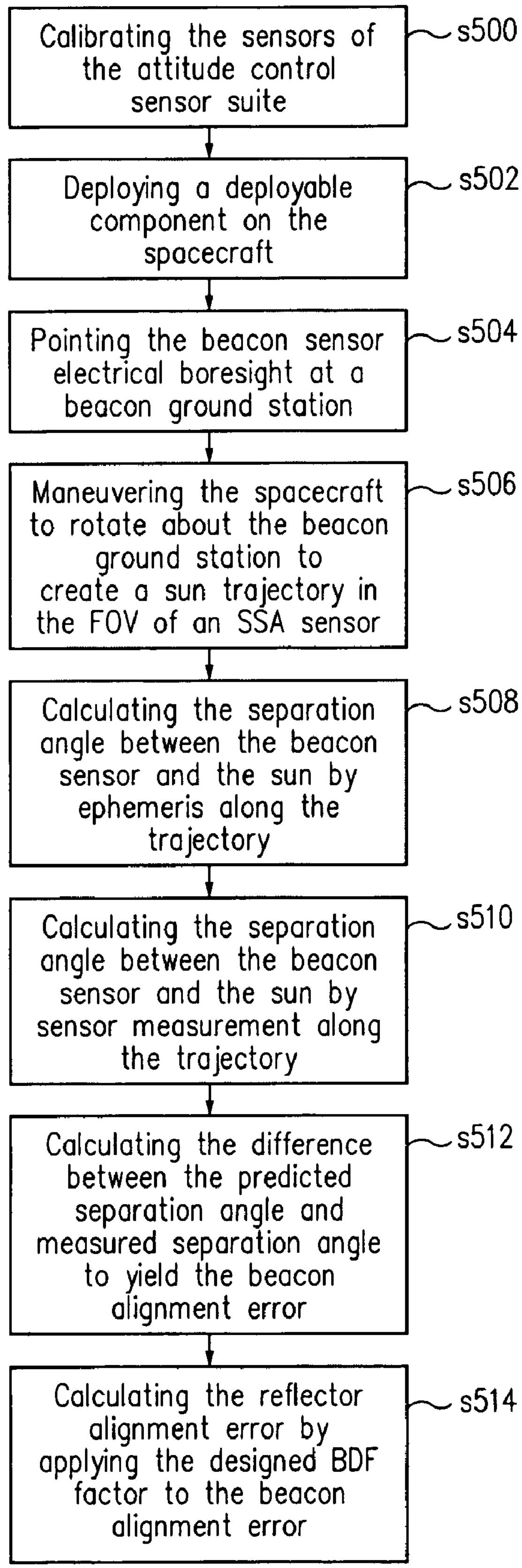
FIG. 5 is a flow chart describing a method for performing an embodiment of the present invention.

Referring now to FIG. 2, FIG. 4 and FIG. 5, an exemplary operational embodiment is described to determine deployment knowledge error in accordance with the present invention.

After obtaining a desired orbit, SSA sensor 206 and SSA sensor 208 are calibrated by acquiring the sun position in an overlapped portion of the FOV of each sensor (s500).

A deployable component, such as deployable reflector 202, is deployed (s502). Beacon sensor 204 is coupled to deployable reflector 202, such that movement of reflector 202 creates movement of the beacon sensor 204. For example, a 0.1° movement of deployable reflector 202 results in a 0.2° movement of beacon sensor 204. The correlation between the movement of reflector 202 and beacon sensor 204 allows the BDF to be calculated.

The beacon boresight of beacon sensor 204 is pointed at a beacon ground station 404 (s504). Beacon ground station 404 can be maintained in the beacon FOV throughout the day during any given orbit.

TABLE 2

| Description | Resolution | Telemetry period |
|---|---|---|
| Measured beacon azimuth angle of beacon in sensor frame from normal telemetry | 16 bits fixed 0.15 milli-deg | 1 sec |
| Measured beacon elevation angle of beacon in sensor frame from normal telemetry | 16 bits fixed 0.15 milli-deg | 1 sec |
| Measured sun unit vector of SSA in body frame from normal telemetry | 16 bits fixed 3.5 milli-deg | 2 sec |
| Beacon sensor data valid flag | True/False | |
| Sun present in SSA FOV | True/False | |
| Sensor separation angle bias (3x1), measured separation angle - predicted separation angle. | 16 bits fixed 0.06 milli-deg | 16 sec |

Unlike beacon ground station 404, the sun is typically only available to be viewed by the SSA sensors for about 4–6 hours in a given day and given orbit. Accordingly, based on the time of year and orbit, a time of day for conducting a sun in FOV maneuver is selected such that the sun can be viewed in the FOV of at least one of SSA sensor 206 and SSA sensor 208.

Figure 6:
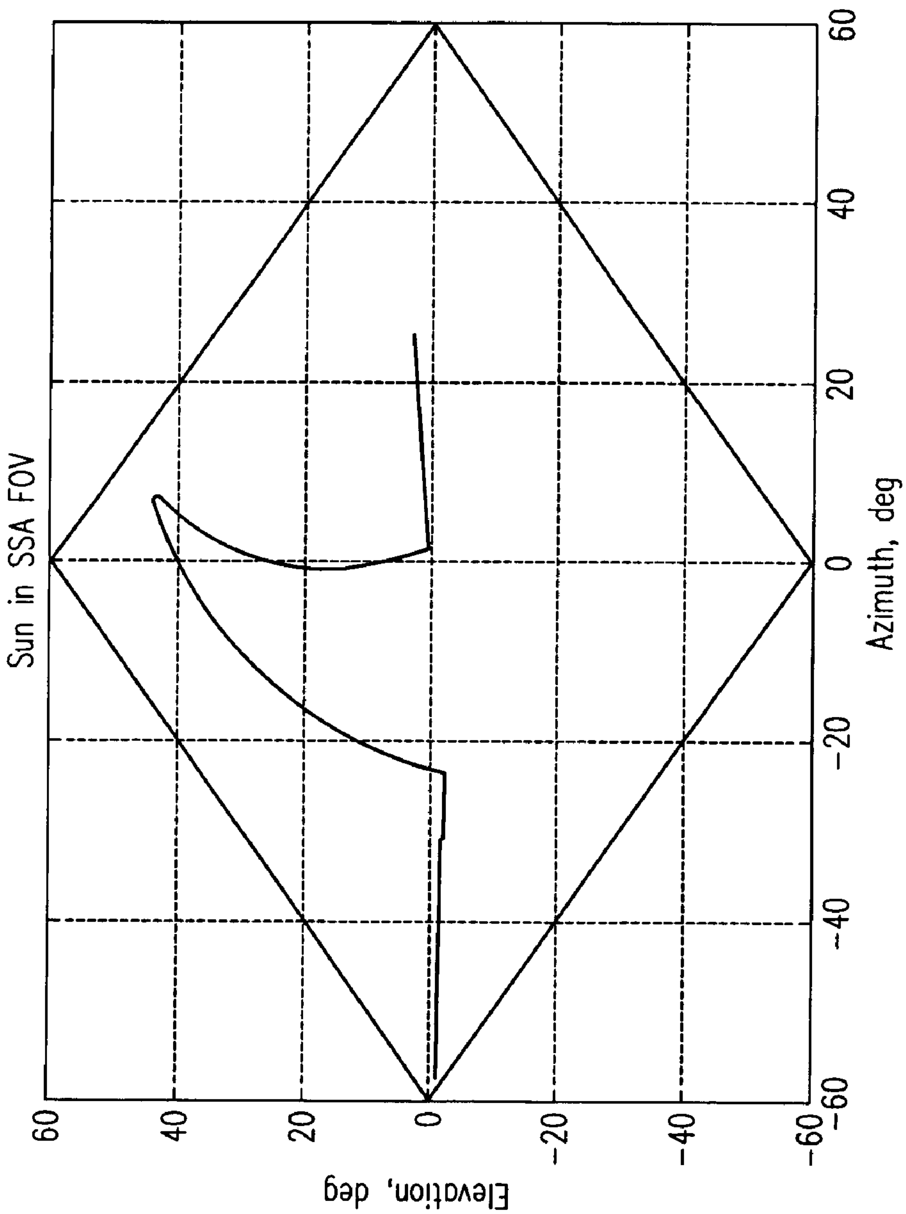
FIG. 6 is an illustration of a trajectory of the sun in the FOV of an SSA sensor in accordance with an embodiment of the present invention.

Once an SSA sensor captures the sun in the FOV, spacecraft 200 can be made to rotate about a reference direction. In one embodiment, the reference direction can be about the beacon ground station (s506), or alternatively, the reference direction can be the beacon boresight, or other optimal reference directions. Spacecraft 200 can be rotated with a rate offset command, an attitude offset command or a trajectory following command such that the sun creates a trajectory within the SSA FOV. The sun's trajectory can be made a complete 360°. However only a segment of the 360° trajectory is necessary, for example, a trajectory in the range of between about 60° and 90°. FIG. 6 is an illustration of the sun in the SSA FOV during a 90° calibration maneuver.

Having both sensors within their respective FOV is necessary to ensure the complete 3-axis attitude determination using 2 linearly independent attitude sensors, and to provide data for measured separation angle computation.

The predicted separation angle between beacon sensor 204 and the sun can be calculated by ephemeris along the trajectory (s508). The measured separation angle between beacon sensor 204 and the sun can be calculated by sensor measurements along the trajectory (s510). The measured separation angle includes any measurement uncertainty that may have occurred over time.

Using a least square fitting routine the difference between the predicted separation angle and measured separation angle is calculated (s512) to yield the beacon alignment error. Alternatively, a standard Kalman filter can be utilized to estimate the alignment error using the trajectory data.

Once the beacon alignment error is calculated, it can be divided by the designed BDF factor (s514) to yield the reflector alignment error. If the reflector and the beacon sensor use different reference coordinates frame, a coordinate transformation can be used.

Although the invention has been described primarily for use with deployable reflectors, it can also be used for use with non-deployable payloads. Advantages for use with non-deployable payloads include the reduction of the need for survey and calibration equipment and time in the ground integration test. Other benefits include the ability to use the in-orbit calibration to calibrate the one-g sag, launch shift, thermal distortion under space environment, and similar functions.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method for performing in-orbit alignment calibration comprising:

providing a spacecraft including a first sensor, a second sensor and a deployable component;

deploying said deployable component having said second sensor coupled thereto;

pointing said second sensor at a first known object to position said spacecraft relative to said first known object;

performing a maneuver to cause said spacecraft to rotate in a reference direction to generate a trajectory of a second known object in a field-of-view (FOV) of said first sensor;

generating data from said trajectory of said second known object in said FOV of said first sensor and from said second sensor representing a measured separation angle between said second known object and said first known object; and calculating an alignment error for said second sensor using the difference between said measured separation angle and a predicted separation angle.

2. The method of claim 1, wherein said first sensor comprises a star tracker and said second known object comprises celestial stars.

3. The method of claim 1, wherein said second sensor comprises a star tracker and said first known object comprises celestial stars.

4. The method of claim 1, wherein said first sensor comprises SSA sensors and said second known object comprises the sun.

5. The method of claim 1, wherein said second sensor comprises a beacon and said first known object comprises a beacon ground station located at the earth's surface.

6. The method of claim 1, wherein said deployable component is a reflector.

7. The method of claim 1, wherein said reference direction in said maneuver is a unit vector from said spacecraft to said first known object.

8. The method of claim 1, wherein said trajectory comprises a one-point trajectory.

9. The method of claim 1, wherein said trajectory comprises multiple separated points.

10. The method of claim 1, wherein said trajectory comprises a segment of a 360° circular trajectory.

11. The method of claim 1, wherein generating a trajectory of said second known object in said FOV of said first sensor comprises holding said second known object in a first plane relative to said second sensor and holding said second known object in a second plane relative to said second sensor.

12. The method of claim 11, wherein said holding said second known object in a first plane relative to said second sensor comprises holding said second known object in an x/z plane relative to said second sensor for azimuth calibration.

13. The method of claim 11, wherein said holding said second known object in a second plane relative to said second sensor comprises holding said second known object in a y/z plane relative to said second sensor for elevation calibration.

14. The method of claim 1, further comprising updating the alignment of said second sensor using said alignment error to improve spacecraft pointing accuracy.

15. The method of claim 1, further comprising:

providing a beam deviation factor based on the coupling between the second sensor and the deployable component; and calculating a mechanical deployment error of said deployable component by applying said beam deviation factor to said second sensor alignment error.

16. The method of claim 15, further comprising updating the alignment of said deployable component using said mechanical deployment error to improve spacecraft pointing accuracy.

17. The method of claim 1, wherein said predicted separation angle is calculated using ephemeris of said second known object and said first known object along said trajectory.

18. A system for performing in-orbit alignment calibration comprising:

a spacecraft including a first sensor, a second sensor, a deployable component and a processor adapted to execute instructions including:

deploying said deployable component having said second sensor coupled thereto;

pointing said second sensor at a first known object to position said spacecraft relative to said first known object;

performing a maneuver to cause said spacecraft to rotate about a reference direction to generate a trajectory of a second known object in a field-of-view (FOV) of said first sensor;

generating data from said trajectory of said second known object in said FOV of said first sensor and from said second sensor representing a measured separation angle between said second known object and said first known object; and calculating an alignment error for said second sensor using the difference between said measured separation angle and a predicted separation angle.

19. The system of claim 18, wherein said first sensor comprises a star tracker and said second known object comprises celestial stars.

20. The system of claim 18, wherein said second sensor comprises a star tracker and said first known object comprises celestial stars.

21. The system of claim 18, wherein said first sensor comprise SSA sensors and said second known object comprises the sun.

22. The system of claim 18, wherein said second sensor comprises a beacon and said first known object comprises a beacon ground station located at the earth's surface.

23. The system of claim 18, wherein said deployable component is a reflector.

24. The system of claim 18, wherein said reference direction in said maneuver is a unit vector from said spacecraft to said first known object.

25. The system of claim 18, wherein said trajectory comprises a one-point trajectory.

26. The system of claim 18, wherein said trajectory comprises multiple separated points.

27. The system of claim 18, wherein said trajectory comprises a segment of a 360° circular trajectory.

28. The system of claim 18, wherein generating a trajectory of said second known object in said FOV of said first sensor comprises holding said second known object in a first plane relative to said second sensor and holding said second known object in a second plane relative to said second sensor.

29. The system of claim 28, wherein said holding said second known object in a first plane relative to said second sensor comprises holding said second known object in an x/z plane relative to said second sensor for azimuth calibration.

30. The system of claim 28, wherein said holding said second known object in a second plane relative to said second sensor comprises holding said second known object in a y/z plane relative to said second sensor for elevation calibration.

31. The system of claim 18, further comprising updating the alignment of said second sensor using said alignment error to improve spacecraft pointing accuracy.

32. The system of claim 18, wherein said processor is further adapted to execute instructions including:

providing a beam deviation factor based on the coupling between the second sensor and the deployable component; and calculating a mechanical deployment error of said deployable component by applying said beam deviation factor to said second sensor alignment error.

33. The system of claim 32, further comprising updating the alignment of said deployable component using said mechanical deployment error to improve spacecraft pointing accuracy.

34. The system of claim 18, wherein said predicted separation angle is calculated using ephemeris of said second known object and said first known object along said trajectory.

35. A method for performing in-orbit alignment calibration comprising:

providing a spacecraft including at least one SSA sensor, a beacon sensor and deployable reflector;

deploying said deployable reflector having said beacon sensor coupled thereto;

pointing said beacon sensor at a beacon ground station positioned on the earth's surface to position said spacecraft relative to said beacon ground station;

performing a maneuver of said spacecraft to cause said spacecraft to rotate about a reference direction to generate a sun trajectory in a field-of-view (FOV) of said SSA sensor;

generating data from said trajectory of said sun in said FOV of said SSA sensor and from said beacon sensor representing a measured separation angle between said beacon sensor and said sun position;

calculating the difference between said measured separation angle and a predicted separation angle to provide a beacon sensor alignment error;

providing a beam deviation factor based on the coupling between said beacon sensor and the deployable reflector; and calculating a mechanical deployment error of said deployable reflector by applying said beam deviation factor to said beacon sensor alignment error.

36. A method for performing in-orbit alignment calibration comprising:

providing a spacecraft including at least a first star tracker, a second star tracker and a deployable reflector;

deploying said deployable reflector having said second star tracker coupled thereto;

pointing said second star tracker at a first celestial star to position said spacecraft relative to said first celestial star;

performing a maneuver of said spacecraft to cause said spacecraft to rotate in a reference direction to generate a trajectory stars in a field-of-view (FOV) of said first star tracker;

generating data from said trajectory stars in said FOV of said first star tracker and from said first celestial star in said second star tracker FOV which represents a measured separation angle between said celestial stars;

calculating the difference between said measured separation angle and a predicted separation angle to provide a second star tracker alignment error;

providing a deviation factor based on the coupling between said second star tracker and the deployable reflector; and calculating a mechanical deployment error of said deployable reflector by applying said deviation factor to said second star tracker alignment error.

37. A method for performing in-orbit alignment calibration comprising:

providing a spacecraft including at least one star tracker, a beacon sensor and a deployable reflector;

deploying said deployable reflector having said beacon sensor coupled thereto;

pointing said beacon sensor at a beacon ground station to position said spacecraft relative to said beacon ground station;

performing a maneuver of said spacecraft to cause said spacecraft to rotate in a reference direction to generate a stars trajectory in a field-of-view (FOV) of said star tracker;

generating data from said trajectory of said stars in said FOV of said star tracker and from said beacon sensor which represents a measured separation angle between said ground station and said stars;

calculating the difference between said measured separation angle and a predicted separation angle to provide a beacon alignment error;

providing a beam deviation factor based on the coupling between said beacon sensor and the deployable reflector; and calculating a mechanical deployment error of said deployable reflector by applying said beam deviation factor to said beacon alignment error.

38. A method for performing in-orbit alignment calibration comprising:

providing a spacecraft including a first sensor, and a second sensor coupled to a deployable component;

pointing said second sensor at a reference direction relative to a first known object;

performing a maneuver to cause said spacecraft to rotate in said reference direction to generate a trajectory of a second known object in a field-of-view (FOV) of said first sensor; and calculating an alignment error for said second sensor using at least in part the data from said trajectory.

39. The method of claim 38 wherein calculating an alignment error employs a Kalman filter.

* * * * *